(12) United States Patent
Duran et al.

(10) Patent No.: US 8,957,850 B2
(45) Date of Patent: Feb. 17, 2015

(54) HAND-HELD COMMUNICATION DEVICES WITH FINGER NAVIGATION USER INTERFACE

(75) Inventors: Jose R. Duran, Williamson, NY (US); Jason Scott, W. Henrietta, NY (US); David Cipolla, Macedon, NY (US)

(73) Assignee: Harris Corporation, Melbourne, FL (US)

( * ) Notice: Subject to any disclaimer, the term of this patent is extended or adjusted under 35 U.S.C. 154(b) by 402 days.

(21) Appl. No.: 13/561,436

(22) Filed: Jul. 30, 2012

(65) Prior Publication Data

US 2014/0028540 A1 Jan. 30, 2014

(51) Int. Cl.
*G09G 5/00* (2006.01)

(52) U.S. Cl.
USPC ............................................ 345/156

(58) Field of Classification Search
USPC .................. 345/156, 157, 168, 649
See application file for complete search history.

(56) References Cited

U.S. PATENT DOCUMENTS

| | | | | |
|---|---|---|---|---|
| 7,225,002 | B2 * | 5/2007 | Lee et al. | 455/575.4 |
| 7,289,824 | B2 * | 10/2007 | Jerbi et al. | 455/556.1 |
| 7,377,046 | B2 * | 5/2008 | Yamada | 33/356 |
| 7,796,118 | B2 | 9/2010 | Groom et al. | |
| 7,917,284 | B2 | 3/2011 | Skarine | |
| 8,416,186 | B2 * | 4/2013 | Yamamoto et al. | 345/157 |
| 2007/0254268 | A1 * | 11/2007 | Adachi et al. | 434/112 |
| 2010/0045593 | A1 * | 2/2010 | Washio et al. | 345/156 |
| 2010/0052951 | A1 * | 3/2010 | Burrell, IV | 341/23 |
| 2011/0050928 | A1 * | 3/2011 | Lee et al. | 348/218.1 |
| 2012/0147047 | A1 * | 6/2012 | Kim | 345/649 |
| 2012/0214546 | A1 * | 8/2012 | Osaka | 455/556.1 |
| 2012/0250082 | A1 * | 10/2012 | Mori | 358/1.15 |
| 2012/0287049 | A1 * | 11/2012 | Feng | 345/168 |
| 2014/0009389 | A1 * | 1/2014 | Sugiura et al. | 345/156 |

* cited by examiner

*Primary Examiner* — Fred Tzeng
(74) *Attorney, Agent, or Firm* — Robert J. Sacco, Esq.; Fox Rothschild LLP

(57) ABSTRACT

Hand-held communication devices (10) include one or more sensors (78, 92) positioned so as to permit the user to perform optical finger navigation (OFN) and other types of finger navigation on a display (68) of the device (10) while the user holds the device (10) using the same hand.

28 Claims, 9 Drawing Sheets

HAND-HELD COMMUNICATION DEVICES WITH FINGER NAVIGATION USER INTERFACE

BACKGROUND OF THE INVENTION

1. Statement of the Technical Field

The inventive arrangements relate to hand-held wireless communication devices such as land-mobile radios (LMRs).

2. Description of Related Art

The ability to operate a hand-held communication device with one hand can be a critical necessity to users such firefighters, paramedics and other types of emergency responders; military personnel; etc. Modern hand-held communication devices, in general, include numerous functional features that require some type of user input. Designing such devices for single-handed operation, therefore, can present a substantial challenge.

Certain types of smart phones incorporate an optical sensor that facilities optical finger navigation, or "OFN," of a cursor or other graphical feature on the phone's display. The optical sensor is usually located on the front of the phone, below or above the display. Alternatively, the display itself may be a touch-sensitive screen that facilitates optical finger navigation. The ergonomics associated with navigating a cursor using an optical sensor or display configured in this manner are generally poor, particularly during single-handed operation of the smart phone, i.e., while the user is holding the phone and attempting to navigate with the same hand.

LMRs and other types of hand-held communication devices that operate in half duplex mode typically include a push to talk or press to transmit (PTT) switch that activates the device's transmit mode. These types of devices, in general, do not have user interfaces commonly found on smart phones, such as optical sensors that facilitate optical finger navigation of a cursor or other graphical feature. The need to maintain the PTT switch of an LMR or other type of half-duplex communication device in a depressed state while transmitting would make one-handed, simultaneous operation of the PTT switch and a conventionally-configured optical finger navigation feature difficult if not impossible for the average user.

SUMMARY OF THE INVENTION

Embodiments of hand-held communication devices include a shell having a front surface including a display element, and a back surface opposed from the front surface. The shell also includes a first and an opposing second side surface extending between the front and back surfaces, a top and a bottom surface extending between the first and second side surfaces, and a first chamfer surface which faces a direction exclusive of directions faced by the front, back, side, top, and bottom surfaces.

The embodiments also include a sensor associated with the first chamfer surface. The sensor is configured to sense a directional input thereto. The embodiments further include transmit/receive circuitry mounted within the shell and operative to transmit and receive.

Other embodiments of hand-held communication devices include a shell. The shell has a front surface including a display element, and a first chamfer surface adjoining the front surface. A normal to the first chamfer surface is angularly offset from a normal to an adjacent portion of the front surface by a first angle. The first angle is less than ninety degrees. The shell also has a second chamfer surface adjoining the front surface. A normal to the second chamfer surface is angularly offset from a normal to an adjacent portion of the front surface by a second angle. The second angle is approximately equal to the first angle. The first and second chamfer surfaces are disposed about a longitudinal centerline of the shell on a substantially symmetrical basis.

The embodiments also include a first and a second sensor associated with the respective first and second chamfer surfaces. Each of the first and second sensors is operative to generate an output responsive to a directional input thereto. The embodiments further include a processing unit communicatively coupled to the first and second sensors. The processing unit is operative to generate an output in response to the outputs of the first and second sensors. The display element is communicatively coupled to the processing unit and is operative to display an image in response to the output of the processing unit. The embodiments also include transmit/receive circuitry mounted within the shell and operative to transmit and receive.

Other embodiments of hand-held communication devices include a shell having a front surface including a display element, a back surface opposed from the front surface, a side surface extending between the front and back surfaces, and a chamfer surface adjoining the front and side surfaces. A normal to the chamfer surface is angularly offset from a normal to an adjacent portion of the front surface by a first angle. The first angle is less than ninety degrees. The normal to the chamfer surface is angularly offset from a normal to an adjacent portion of the side surface by a second angle. The second angle is less than ninety degrees.

The embodiments also include a sensor associated with the chamfer surface. The sensor is operative to generate an output responsive to a directional input thereto. The embodiments further include a processing unit communicatively coupled to the sensor and operative to generate an output in response to the output of the sensor. The display element is communicatively coupled to the processing unit and is operative to display an image in response to the output of the processing unit. The embodiments further include transmit/receive circuitry mounted within the shell and operative to transmit and receive. The embodiments also include a switch communicatively coupled to the transmit/receive circuitry, mounted on or extending through the side surface, and configured to generate an output when depressed. The transmit/receive circuitry is operative to transmit in response to the output of the switch.

Methods of operating a hand-held communication device include grasping a shell of the device with only a first hand while, on a simultaneous basis, moving a thumb of the first hand across a first sensor of the device to prompt a response on a display of the device, and depressing a switch of the device with a portion of the first hand to activate transmit/receive circuitry of the device to transmit.

BRIEF DESCRIPTION OF THE DRAWINGS

Embodiments will be described with reference to the following drawing figures, in which like numerals represent like items throughout the figures and in which.

DETAILED DESCRIPTION

Figure 1:
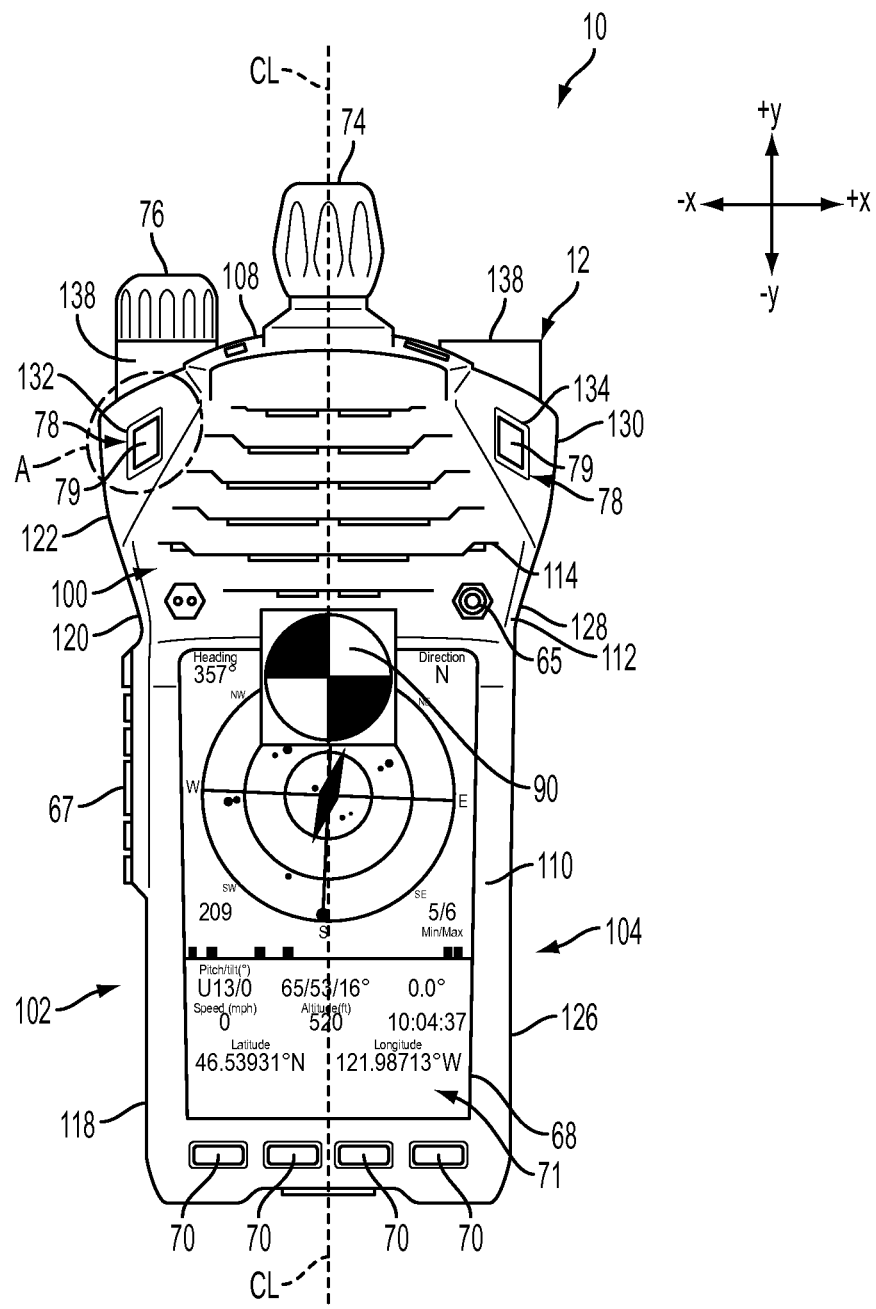
FIG. 1 is a front view of a hand-held communication device.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

FIG. 1-9 depict a hand-held communication device in the form of a hand-held radio 10. The radio 10 can be, for example, an LMR that facilitates wireless communications in the half-duplex mode. The inventive concepts disclosed and claimed herein are described in connection with an LMR for exemplary purposes only; the inventive concepts can be applied to other types of communication devices, including devices such as cellular telephones, smart phones, and other devices that operate in full-duplex mode.

The radio 10 comprises a shell 12 formed from an impact-resistant material such as high-impact plastic. The shell 12 has a longitudinal centerline "CL" that extends substantially in the "z" direction denoted in the coordinate system depicted in the figures.

The shell 12 includes a front surface 100, a first side surface 102, a second side surface 104, a rear surface 106, and an upper surface 108. The front surface 100 includes a lower portion 110, an intermediate portion 112 that adjoins the lower portion 110, and an upper portion 114 that adjoins the intermediate portion 112, as shown in FIGS. 1, 2, 4, and 5. The lower portion 110 is disposed substantially in a plane extending in the "y" and "z" directions as denoted in the coordinate system depicted in the figures. The lower portion 110 thus faces the "x" direction, i.e., a normal to the lower portion 110 extends in the "x" direction. The intermediate and upper portions 112, 114 are angled outwardly in relation the lower portion 110, from the perspective of FIG. 2.

The first side surface 102 includes a lower portion 118, an intermediate portion 120 that adjoins the lower portion 118, and an upper portion 122 that adjoins the intermediate portion 120, as shown in FIGS. 1, 2, 4, and 5. The lower portion 118 adjoins the lower portion 110 of the front surface 100, and is disposed substantially in a plane extending in the "x" and "y" directions. The lower portion 118 thus faces the "z" direction, i.e., a normal to the lower portion 118 extends in the "z" direction. The intermediate portion 120 and the upper portion 122 of the first side surface 102 are angled outwardly in relation to the lower portion 118, from the perspective of FIG. 1.

Figure 4:
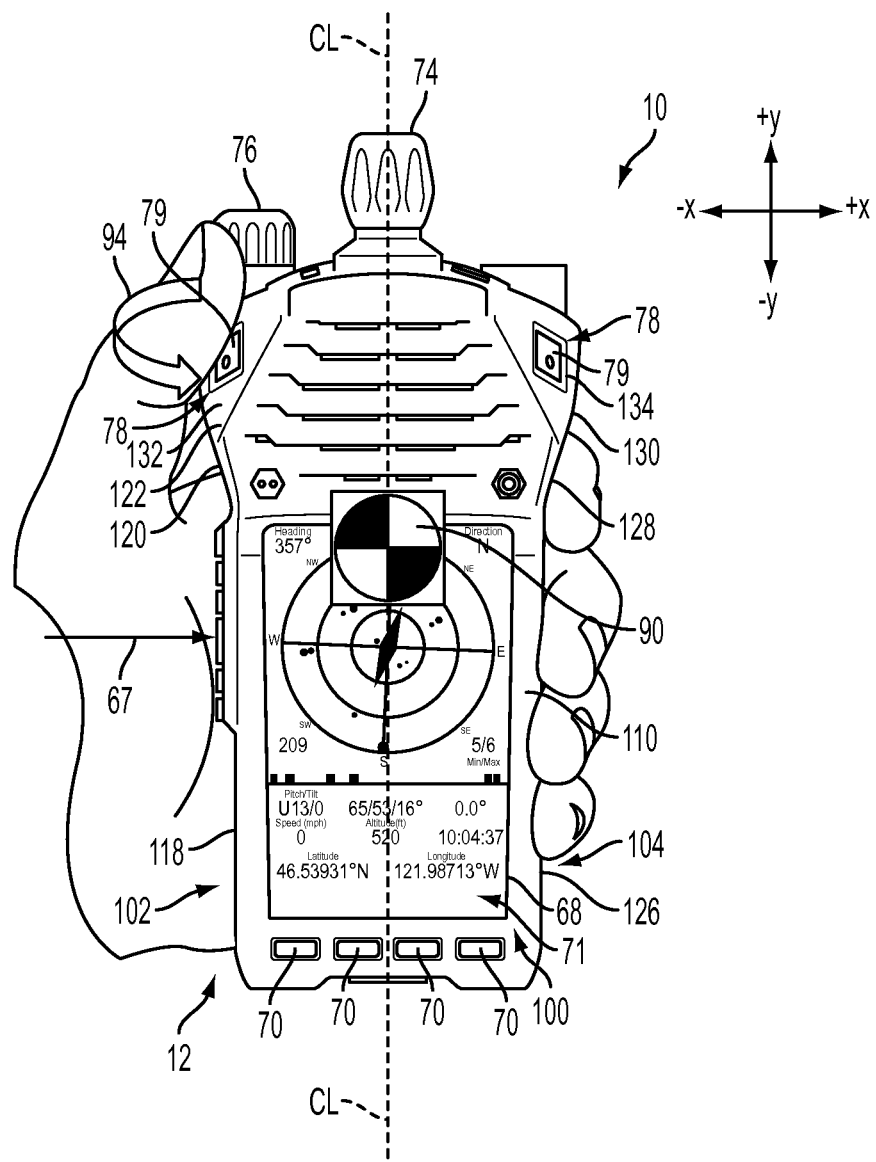
FIG. 4 is a front view of the hand-held communication device shown in FIGS. 1-3, being held in and operated by a left hand of a user.
Figure 5:
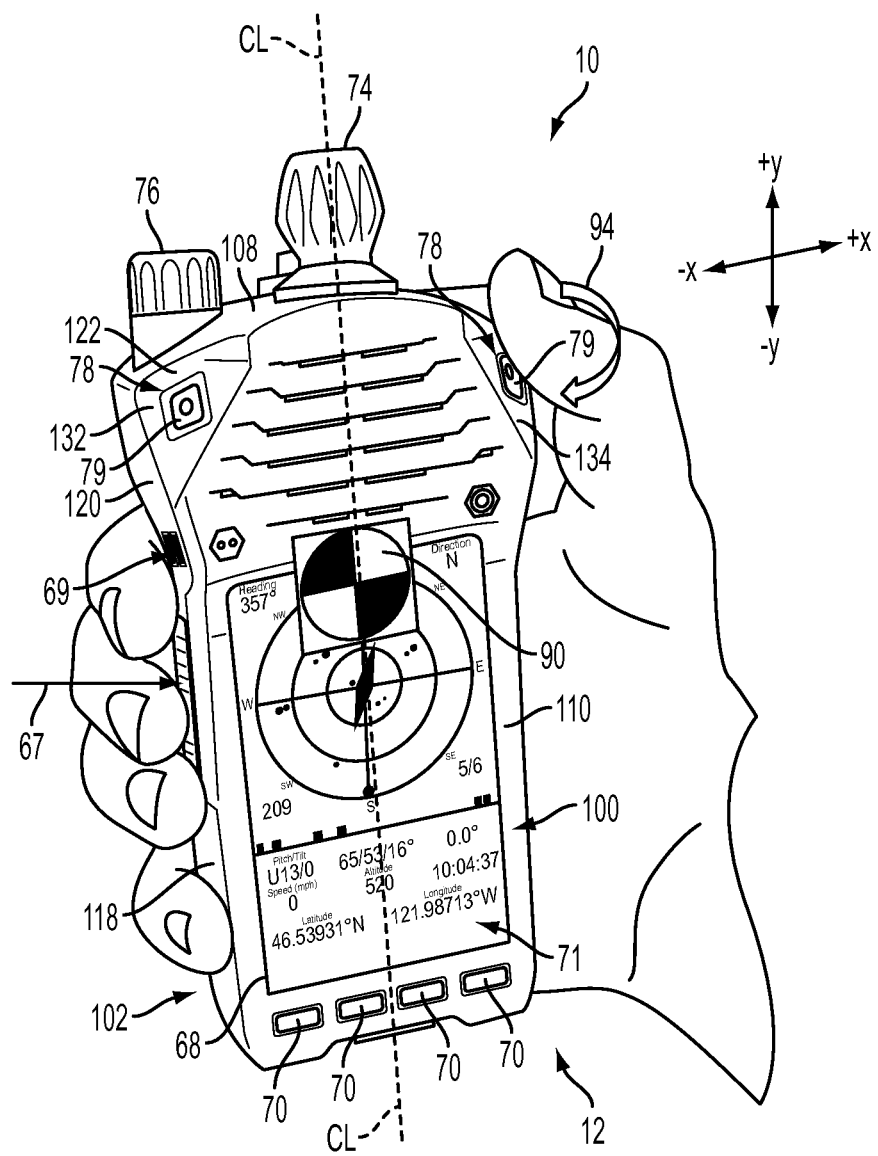
FIG. 5 is a front view of the hand-held communication device shown in FIGS. 1-4, being held in and operated by a right hand of the user.

The second side surface 104 includes a lower portion 126, an intermediate portion 128 that adjoins the lower portion 126, and an upper portion 130 that adjoins the intermediate portion 128, as shown in FIGS. 1, 4, and 5. The lower portion 126 adjoins the lower portion 110 of the front surface 100, and is disposed substantially in a plane extending in the "x" and "y" directions. The lower portion 126 thus faces the "z" direction, i.e., a normal to the lower portion 126 extends in the "z" direction. The intermediate portion 128 and the upper portion 130 of the second side surface 104 are angled outwardly in relation to the lower portion 126, from the perspective of FIG. 1.

Figure 2:
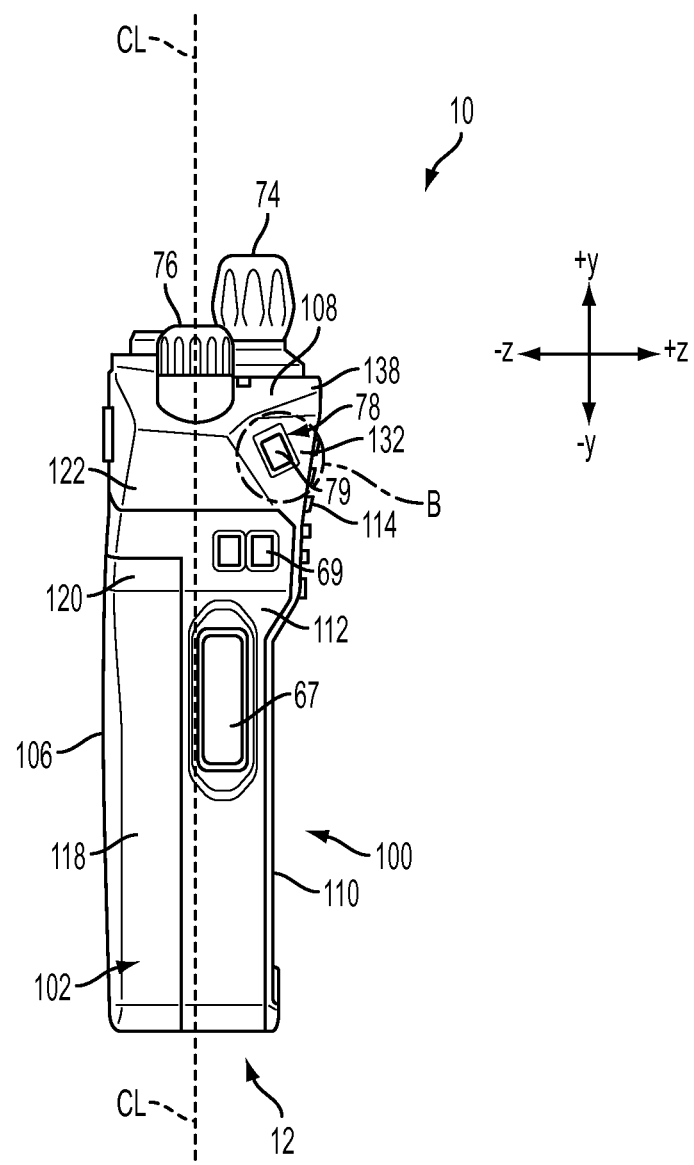
FIG. 2 is a side view of the hand-held communication device shown in FIG. 1.

The shell 12 also includes two chamfer surfaces, or minor planar surfaces 132, 134. The surfaces 132, 134 form the upper front corners of the shell 12, as shown in FIGS. 1, 2, 4, and 5. The surface 132 adjoins the intermediate and upper portions 120, 122 of the first side surface 102; the upper portion 114 of the front surface 100; and the upper surface 108, as can be seen in FIGS. 1 and 2. The surface 134 adjoins the intermediate and upper portions 128, 130 of the second side surface 104; the upper portion 114 of the front surface 100; and the upper surface 108, as can be seen in FIG. 1.

Figure 6:
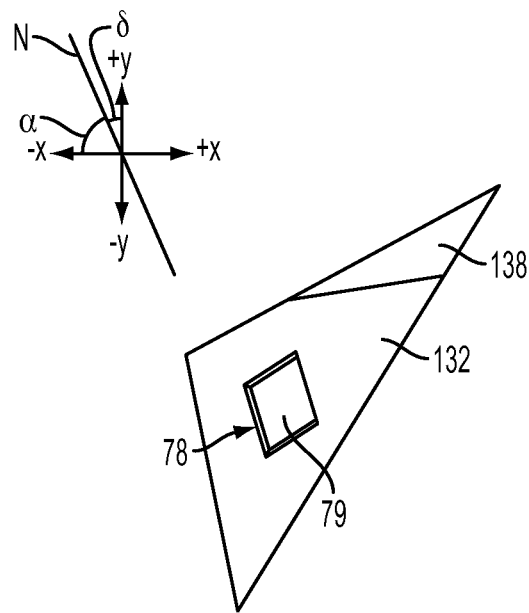
FIG. 6 is a magnified view of the area designated "A" in FIG. 1.
Figure 7:
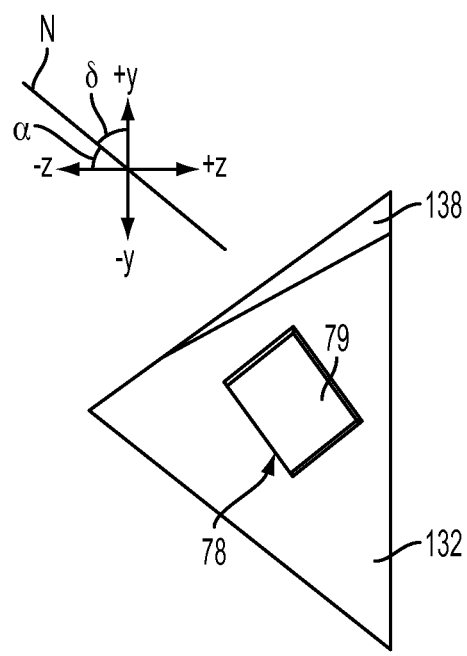
FIG. 7 is a magnified view of the area designated "B" in FIG. 2.

A normal "N" to the surface 132 is angled in relation to the x, y, and z directions by the following respective angles: α, δ, and γ. The angles α and δ are depicted in FIGS. 6 and 7; the angle γ is not visible in these figures due to the perspective thereof. The angles α, δ, and γ can have the respective values of, for example, approximately 30 to approximately 45 degrees; approximately 10 to approximately 20 degrees; and approximately 40 to approximately 60 degrees. As discussed below, the angles α, δ, and γ can have other values in alternative embodiments. A normal to the surface 134 is angled in a similar manner, so that the surfaces 132, 134 are substantially symmetrically disposed about the longitudinal centerline CL of the shell 12, as shown in FIGS. 1. 4, and 5. The surfaces 132, 134 thus face directions other than the "x," "y," and "z" directions.

A raised portion or ridge 138 is formed at the interface of the upper surface 108 and the surface 132, as can be seen in FIGS. 1, 2, and 4-7. Another ridge 138 is formed at the interface of the upper surface 108 and the surface 134. Functional characteristics of the ridges 138 are discussed below.

The radio 10 also includes the following components housed within the shell 12: transmit/receive circuitry 50 configured to facilitate the transmission and reception of radio frequency (RF) signals; a processing unit 51; a transmit/receive antenna jack 55 configured to mate with a whip antenna; a power supply 56; input/output circuitry 58; and a bus 60 that facilitates communication between the various electronic components of the radio 10. These components are depicted schematically in FIG. 8.

The processing unit 51 comprises a processor 52; a memory 53; and computer-executable instructions 54. The computer-executable instructions 54 are stored on the memory 53, and are capable of being executed by the processor 52. These components are depicted schematically in FIG. 9.

The radio 10 further includes a speaker 62 mounted behind a grill formed in the upper portion 114 of the front surface 100 of the shell 12, and an amplifier 63 electrically connected to the speaker 62. The amplifier 63 is configured to generate an output that drives the speaker 62, in response to inputs from the input/output circuitry 58. The speaker 62 and amplifier 63 are depicted schematically in FIG. 8.

The radio 10 further includes a microphone 64 mounted behind the grill formed in the front surface 100 of the in the shell 12. The microphone 64 is configured to convert voice and other acoustical inputs into an electrical signal that is transmitted to and processed by the input/output circuitry 58. The microphone 64 is depicted schematically in FIG. 8.

Figure 3:
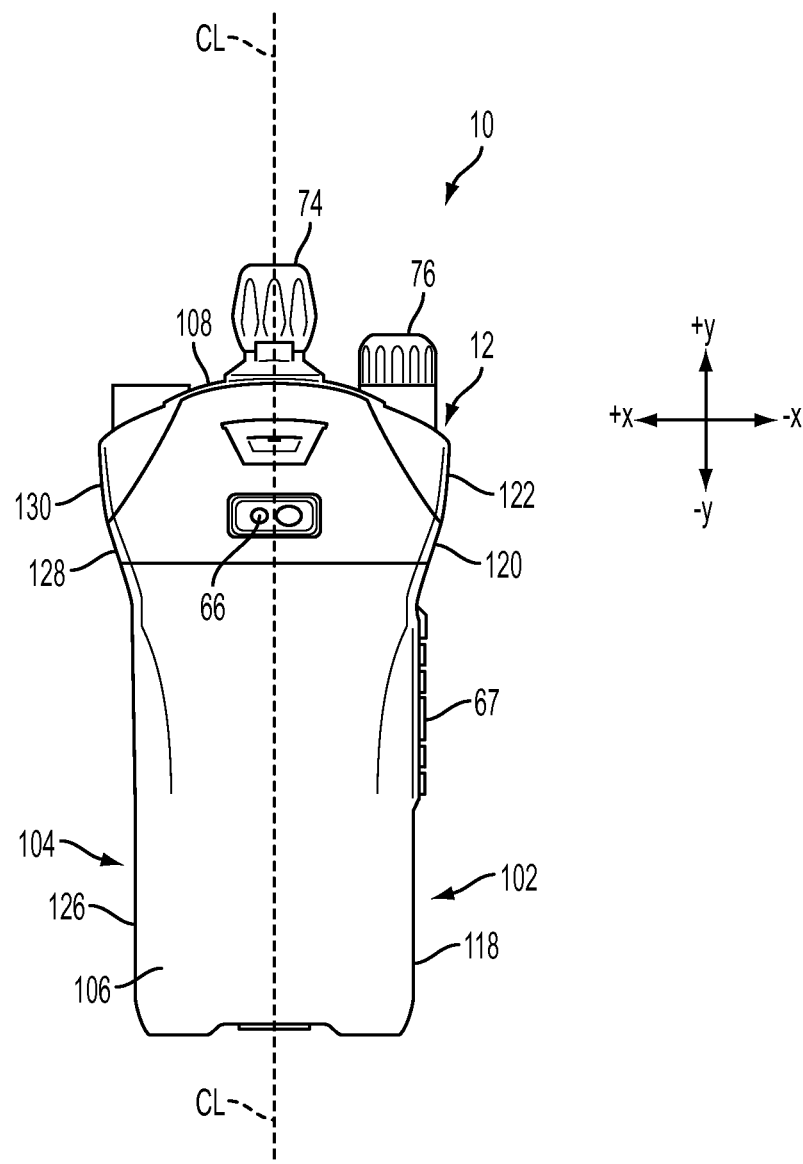
FIG. 3 is a rear view of the hand-held communication device shown in FIGS. 1 and 2.

The radio 10 is also equipped with a two mega-pixel camera 65 mounted in part within an opening in the intermediate portion 112 of the front surface 100 of the shell 12 as shown in FIG. 1. The radio 10 further includes a five mega-pixel camera 66, equipped with flash, mounted in part within an opening in the rear surface 106 of the shell 12 as shown in FIG. 3.

The radio 10 also includes four programmable side buttons 69. Two of the buttons 69 are accessible through openings formed in the intermediate portion 120 of the first side surface 102, as shown in FIGS. 2 and 5. The other two buttons 69 are accessible through openings (not shown) formed in the intermediate portion 128 of the second side surface 102.

The radio 10 further comprises a PTT button or switch 67. The PTT switch 67 is mounted on the lower portion 110 of the first side surface 102 of the shell 12, approximately halfway between the upper and lower ends of the shell 12 as illustrated in FIGS. 1-5. The PTT switch 67 can be mounted on the second side surface 104 in alternative embodiments. The PTT switch 67 is configured to generate an electrical output that, when received by the transmit/receive circuitry 50 via the bus 60, causes the transmit/receive circuitry 50 to transmit. The radio 10 also has a volume control/on-off knob 74, and a channel-selector-frequency knob 76 both mounted on the top surface 108 of the shell 12 as depicted in FIGS. 1-5.

The radio 10 further comprises a display 68 mounted within the shell 12 below the speaker 62, as can be seen in FIGS. 1, 4, and 5. Access to a viewing face 71 of the display 68 is provided by an opening in the lower portion 110 of the front surface 100 of the shell 12. The display 68 is a 3.5-inch touch-sensitive capacitive display. Other types of displays can be used in the alternative.

The radio 10 further includes an accelerometer 77 communicatively coupled to the processing unit 51. The accelerometer 77 generates an output indicative of the orientation of the radio 10. The processing unit 51 is configured to generate an output that causes the display 68 to display the image on its viewing face 71 in a portrait orientation when the radio 10 is oriented as depicted in FIGS. 1, 4, and 5, and in a landscape orientation when the orientation of the radio 10 is angularly offset by approximately 90 degrees from the orientation depicted in FIGS. 1, 4, and 5. The accelerometer 77 is depicted schematically in FIG. 8.

The radio 10 further includes four input buttons 70. The buttons 70 extend through openings in the shell 12 formed in the lower portion 110 of the front surface 100 of the shell 12, directly below the display 68 as shown in FIGS. 1, 4, and 5. The buttons 70 are mechanical switches that, when depressed, generate an electrical output. The buttons 70 can be capacitive or other types of switches in alternative embodiments.

The respective functions associated with the input buttons 70 correspond to the function buttons on typical smart phone. In particular, the processing unit 51 is configured to recognize the inputs from the respective buttons 70 as inputs corresponding to the following functions: home, menu, back, and search.

The radio 10 also comprises two touch-sensitive optical track pads, or optical sensors 78. The optical sensors are depicted in FIGS. 1, 2, and 4-7. Each optical sensor 78 has an outwardly-facing sensing surface or face 79, as can be seen in FIGS. 1, 6, and 7. Each optical sensor 78 is mounted within the shell 12, proximate an associated one of the surfaces 132, 134. Access to the sensing face 79 of each optical sensor 78 is provided by an aperture or opening formed in the associated surface 132, 134. The sensing face 79 of each optical sensor 78 is recessed slightly in relation to the associated surface 132, 134, and is disposed in substantially the same orientation as the associated surface 132, 134.

Each of the surfaces 132, 134 has a raised area or ridge 138 formed therein, as discussed above. The ridges 138 can protect the optical sensors 78 in the event the radio 10 is dropped onto a floor or other surface, by preventing the surface 132 or surface 134 from contacting the floor at anything other than an oblique angle. In lieu of, or in addition to the ridges 138, the sensing faces 79 of the optical sensors 78 can be sufficiently recessed in relation to the associated surfaces 132, 134 so as to reduce the potential for damage to the optical sensors 78 in the event the radio 10 is dropped squarely onto one of the surfaces 132, 134.

Figure 8:
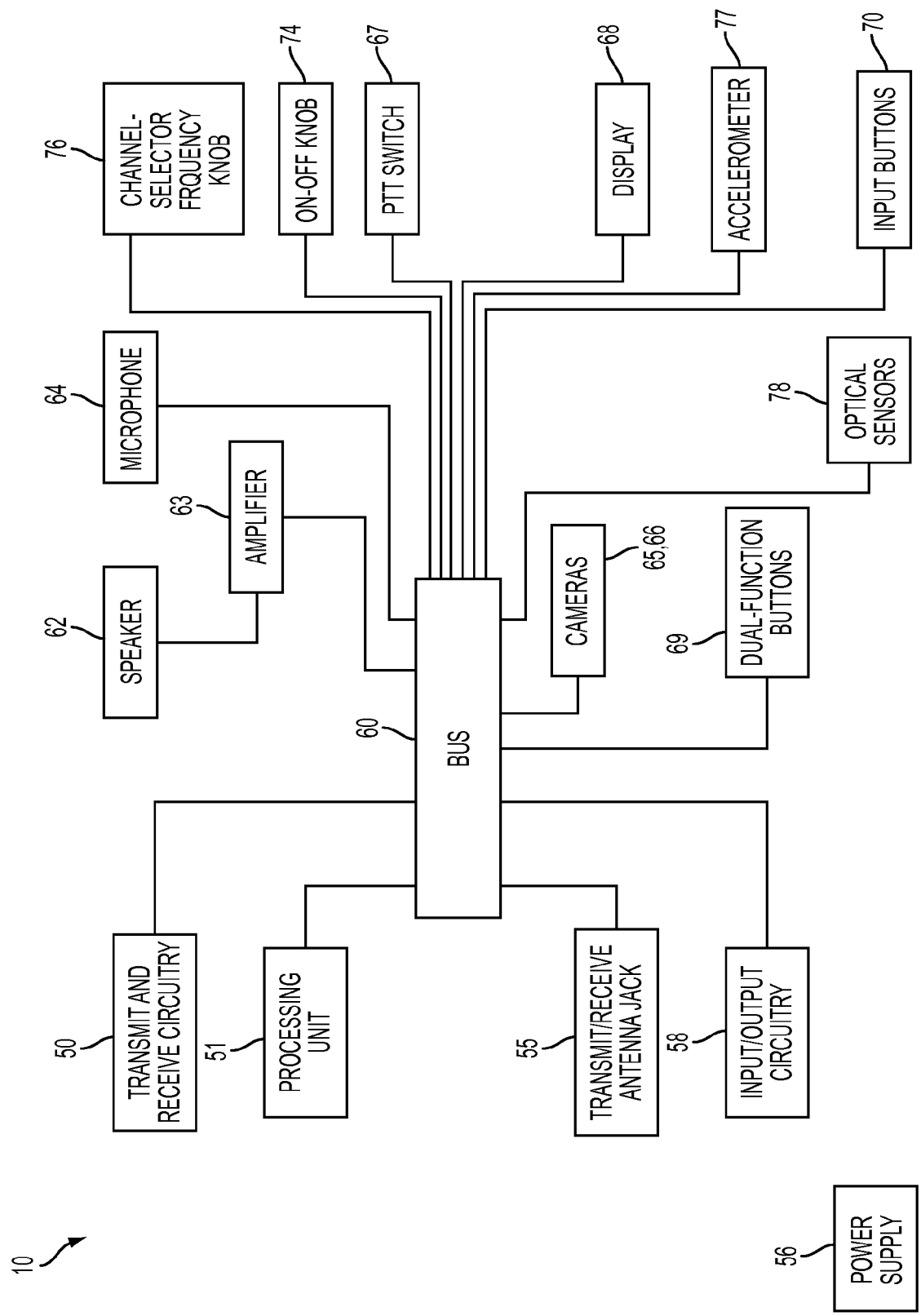
FIG. 8 is a schematic illustration of various electrical and electronic components of the hand-held communication device shown in FIGS. 1-7.

Each of the optical sensors 78 is communicatively coupled to the processing unit 51, as denoted in FIG. 8. The optical sensors 78 are substantially identical. Each optical sensor 78 generates an electrical output in response to movement of the user's finger, or other object, across the sensing face 79 thereof. The output is representative of the direction of movement of the user's finger across the sensing face 79. The optical sensors 78 can be relatively low-cost, commercial off the shelf optical sensors.

Figure 10:
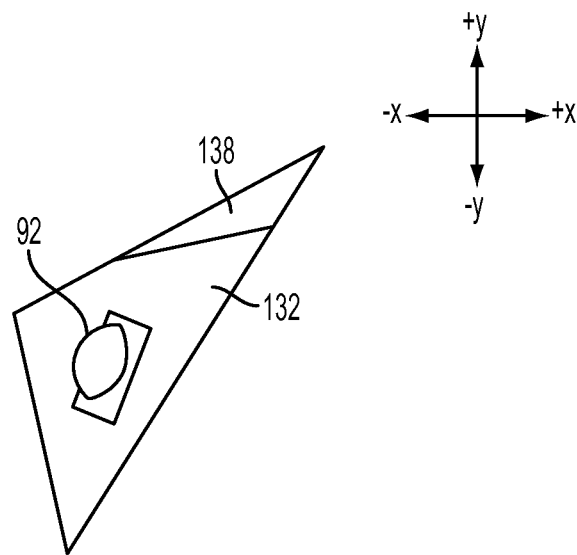
FIG. 10 is a view of an alternative embodiment of the hand-held communication device shown in FIGS. 1-9, taken from the same perspective as FIG. 6.

Sensors other than the optical sensors 78 can be used in alternative embodiments. For example, track ball sensors 92 can be used in lieu of the optical sensors 78. The track ball sensors 92 can be integrated into the radio 10 so that a portion of the track ball of each sensor 92 projects above the associated surface 132, 134 of the shell 12, as shown in FIG. 10. In other alternative embodiments, capacitive sensors can be used in lieu of the optical sensors 78.

Figure 9:
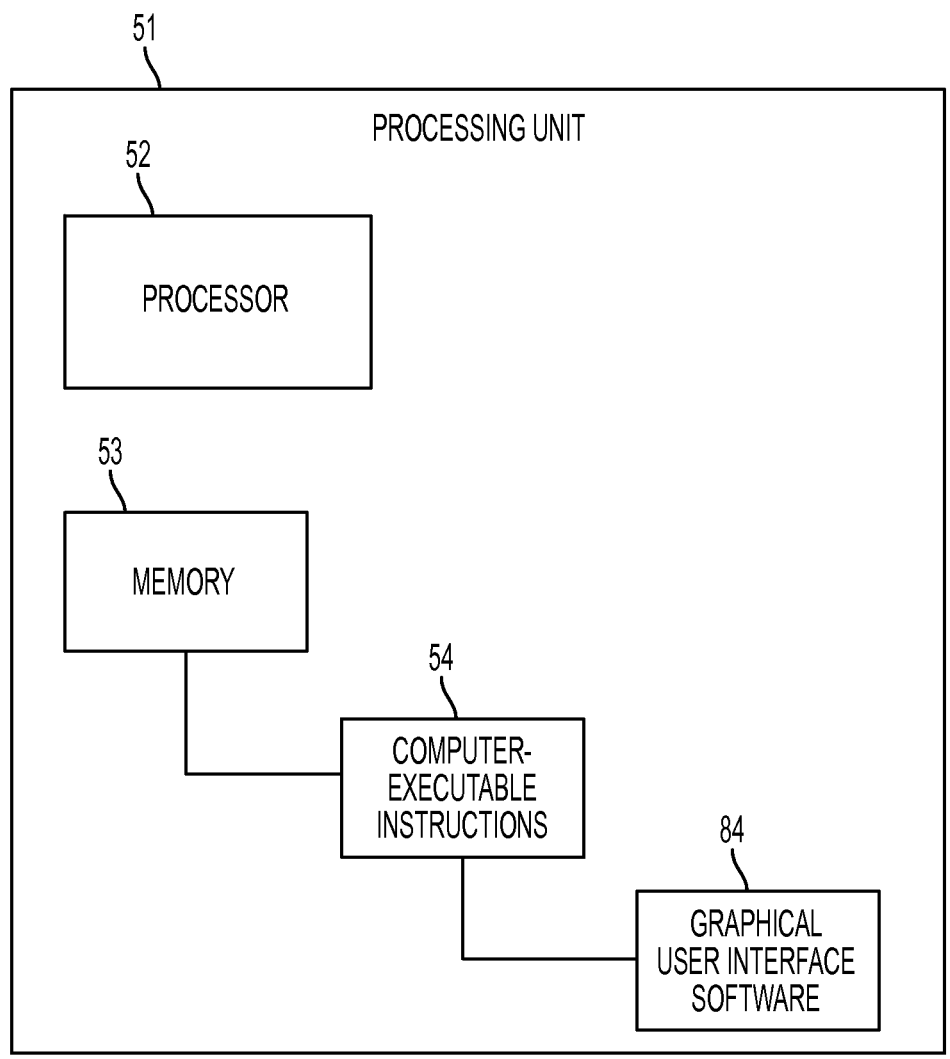
FIG. 9 is a schematic illustration of a processing unit of the hand-held communication device shown in FIGS. 1-8.

The computer-executable instructions 54 of the processing unit 51 include graphical user interface (GUI) software 84, as depicted in FIG. 9. The GUI software 84 is configured so that the software 84, when executed by the processor 52, causes the processor 52 to recognize the direction of movement of the user's finger across the sensing face 79 of each optical sensor 78, based on the output of the sensor 78. The GUI software 84 also causes the processor 52 to generate an output that, when received by the display 68, causes a cursor to move across the viewing face 71 of the display 68 in the same relative direction as the user's finger across the sensing face 79 of the optical sensor 78.

Each optical sensor 78 is further configured to generate a secondary output when pressed. The GUI software 84 causes the processor 52 to recognize the secondary output as an "enter" or "return" command. The user can thus move one of his or her fingers across the sensing surface 79 of one of the optical sensors 78 so as to place the cursor on a particular input, e.g., function, word, number, symbol, hyperlink, etc., being displayed on the viewing face 71 of the display 68. The user can then select that particular input by depressing the optical sensor 78.

The GUI software 84 is further configured to permit the user to change the function associated with the output of one or both of the optical sensors 78. In particular, the GUI software 84 causes the processor 52 to generate an output that causes a series of menu-driven options to be displayed on viewing face 71 of the display 68. The options can guide the user to select a function, other than cursor movement, to be effectuated by movement of the user's finger across one or both of the optical sensors 78. For example, the GUI software 84 can provide the user with the option to use one of the sensors 78 to zoom into or out of the image being displayed on the viewing face 71 of the display 68. This feature can be used, for example, when the radio 10 is being held and operated in the landscape mode as discussed above.

The configuration of the optical sensors 78 and the PTT switch 67 facilitate ergonomically-friendly one-handed operation of the radio 10, when the radio 10 is being held in either the right or the left hand of the user. For example, FIG. 4 depicts the radio 10 being held in the left hand of the user. As can be seen in this figure, the positioning of the left optical sensor 78 allows the thumb on the user's left hand to reach the left optical sensor 78 while the user is grasping the radio 10 with the same hand. The user can thus move the cursor on the display 68 using his or her left thumb, as denoted by the arrow 94, to highlight a desired input that is being generated and shown on the display 68 as part of the graphical user interface provided by the GUI software 84. The user can depress the left optical sensor 78 using the user's left thumb, to effectuate a "return" input that causes the highlighted input to be selected and executed by the processing unit 51. In addition, as can be seen in FIG. 4, the user can simultaneously depress the PTT switch 67 using the palm of the user's left hand, to activate the transmit function of the radio 10.

FIG. 5 depicts the radio 10 being held in the right hand of the user. As shown in this figure, the positioning of the right optical sensor 78 allows the thumb on the user's right hand to reach the right optical sensor 78 while the user is grasping the radio 10 with the same hand. The user can thus move the cursor on the display 68 using his or her right thumb, as denoted by the arrow 94, to highlight a desired input that is being generated and shown on the display 68. The user can depress the right optical sensor 78 using the user's right thumb, to select the highlighted function for execution by the processing unit 51. In addition, as can be seen in FIG. 5, the user can simultaneously depress the PTT switch 67 using the fingers of the user's right hand, to activate the transmit function of the radio 10.

As discussed above, the normal N to the surface 132 is angled in relation to the x, y, and z directions by the respective angles $\alpha$, $\delta$, and $\gamma$, having the respective values of approximately 41 degrees; approximately 18 degrees; and approximately 44 degrees. The normal to the surface 134 is similarly angled. The noted angles can be varied in alternative embodiments; optimally, the resulting orientations of the surfaces 132, 134 should be such that the user's thumb can reach the optical sensors 78 when the radio 10 is being held as depicted in FIGS. 4 and 5. In other possible alternative embodiments, the sensors 78 can be located on the sides of the shell 12, instead of on the dedicated surfaces 132, 134.

As can be seen in FIGS. 4 and 5, the shell 12 is configured so that the index finger of the user, and the portion of the user's palm proximate the thumb rest against the outwardly-angled intermediate portions 120, 128 of the first and second side surfaces 102, 104 when the radio 10 is being held as depicted in those figures. This feature is believed to enhance the stability of the radio 10 and the comfort of the user when the user is holding the radio 10 in the as-shown manner.

The vertical, i.e., y-axis, location of the center of gravity (CG) of the radio 10 is denoted in FIGS. 1, 4, and 5 by the reference character 90. The radio 10 is configured so that the CG 90 is located at a vertical position slightly below the lower ends of the intermediate portions 120, 128 of the respective first and second side surfaces 102, 104. Because the intermediate portions 120, 128, as discussed above, form a resting place for the index finger of the user, and the portion of the user's palm proximate the thumb, the vertical location of the CG 90 will coincide roughly with the uppermost location at which the user is grasping the radio 10 when the radio 10 is being held as depicted in FIGS. 4 and 5. It is believed that relating the location of the CG 90 to the hand position of the user in this manner enhances the stability of the radio 10.

A user can thus transmit using the radio 10, and on a simultaneous basis, navigate a cursor and select inputs shown on the display 68, using one hand, while holding the radio 10 in the same hand in a secure, stable, and comfortable manner. Moreover, positioning each optical sensor 78 on its own stand-alone surface, i.e., the surfaces 132, 134, can reduce or eliminate the potential for the user's thumb or other finger to interfere with other structure on the radio 10, or to inadvertently activate other functional features of the radio 10 while the user is providing inputs to the optical sensors 79. This feature can also make it relatively easy for the user to provide inputs to the optical sensors 78 while wearing gloves or other hand coverings.

The respective locations and relative orientations of the optical sensors 78 allow the user to readily locate the optical sensors 79 in darkness and other low and zero-visibility conditions. Moreover, positioning the optical sensors 78 at locations other than the front surface of the shell 12 can potentially give the radio 10 a more compact profile than a comparable radio having an optical sensor mounted on a front surface thereof. Also, the various smart-phone-like features of the radio 10, such as ability to use finger navigation to move a cursor across a display and the arrangement of the input buttons 70, can enhance the ease of use of the radio 10 to users accustomed to operating smart phones.

What is claimed is:

1. A hand-held communication device, comprising:
a shell comprising:
    a front surface including a display element;
    a back surface opposed from said front surface;
    a first and an opposing second side surface each extending between said front and back surfaces;
    a top and a bottom surface extending between said first and second side surfaces; and
    a first chamfer surface which faces a direction exclusive of directions faced by said front, back, side, top, and bottom surfaces;
a sensor associated with said first chamfer surface, said sensor configured to sense a directional input thereto; and
transmit/receive circuitry mounted within the shell and operative to transmit and receive.

2. The shell according to claim 1, wherein said first chamfer surface extends between said front surface and at least one of said first side surface and said top surface.

3. The shell according to claim 1, wherein said first chamfer surface extends between said front surface, said first side surface, and said top surface.

4. The shell according to claim 1, wherein the directional input comprises at least two orthogonal directions.

5. The shell according to claim 1, wherein said first chamfer surface connects at least two surfaces that are disposed at substantially at right angles.

6. The device of claim 1, further comprising a processing unit communicatively coupled to said sensor and operative to generate an output in response to an output of said sensor; wherein said display element is communicatively coupled to said processing unit and is operative to display an image in response to said output of said processing unit.

7. The device of claim 6, wherein said processing unit is configured so that said output of said processing units results in movement of a cursor across said image.

8. The device of claim 6, further comprising a first, a second, a third, and a fourth input button each communicatively coupled to said processing unit and configured to generate an output when pressed; wherein said processing unit is configured to recognize said outputs of said first, second, third, and fourth input buttons as corresponding to the respective functions of: home; menu; back; and search.

9. The device of claim 1, wherein said sensor is an optical sensor operative to generate an output in response to movement across a sensing face thereof.

10. The device of claim 1, wherein said sensor is a track ball sensor operative to generate an output in response to movement of a track ball thereof.

11. The device of claim 1, wherein:
said shell further comprises: a second chamfer surface which faces a direction exclusive of directions faced by said front, back, side, bottom, and first chamfer surfaces; and
said device further comprises a second sensor associated with said second chamfer surface and operative to generate an output in response to a directional input thereto.

12. The device of claim 11, wherein said first and second sensors are substantially symmetrically disposed about a longitudinal centerline of the shell.

13. The device of claim 1, further comprising a switch communicatively coupled to said transmit/receive circuitry and configured to generate an output when depressed, wherein said transmit/receive circuitry is operative to transmit in response to the output of the switch.

14. The device of claim 13, wherein said switch is disposed on said first side of said device and said at least one sensor is associated with a chamfered surface adjacent to a second side of said device, whereby a user holding said device in a hand can use a thumb of said hand to interact with said sensor and concurrently depress said switch using a finger of the hand.

15. The device of claim 14, wherein:
said shell further comprises: a second chamfer surface which faces a direction exclusive of the directions faced by said front, back, side, bottom, and first chamfer surfaces; and
said device further comprises a second sensor associated with said second chamfer surface and operative to generate an output in response to a directional input thereto; and
said shell is further configured so that the user can hold said device in a second hand, and on a simultaneous basis, move a thumb of the second hand across said second sensor and depress said switch using the second hand.

16. The device of claim 1, wherein:
a normal to said first chamfer surface is disposed at a first angle in relation to a first direction coinciding with a longitudinal centerline of said shell, the first angle being equal to approximately 30 to approximately 45 degrees;
the normal to said first chamfer surface is disposed at a second angle in relation to a second direction, the second direction being angularly offset from the first direction by approximately 90 degrees, the second angle being equal to approximately 10 to approximately 20 degrees; and
the normal to said first chamfer surface is disposed at a third angle in relation to a third direction, the third direction being angularly offset from each of the first and second directions by 90 degrees, the third angle being equal to approximately 40 to approximately 60 degrees.

17. The device of claim 1, wherein:
said first and second side surfaces each have a first portion extending substantially in a lengthwise direction of said shell, and a second portion adjoining said first portion and being angled outwardly in relation to a longitudinal centerline of said shell; and
said device is configured so that a location of the center of gravity of said device in relation to the lengthwise direction of said shell coincides substantially with a location, in relation to the lengthwise direction of said shell, at which said first and second portions of said first and second side surfaces adjoin.

18. A hand-held communication device, comprising:
a shell comprising:
a front surface including a display element;
a first chamfer surface adjoining said front surface, wherein a normal to said first chamfer surface is angularly offset from a normal to an adjacent portion of said front surface by a first angle, said first angle being less than ninety degrees;
a second chamfer surface adjoining said front surface, wherein a normal to said second chamfer surface is angularly offset from a normal to an adjacent portion of said front surface by a second angle, said second angle being approximately equal to said first angle, said first and second chamfer surfaces being disposed about a longitudinal centerline of said shell on a substantially symmetrical basis;
a first and a second sensor associated with said respective first and second chamfer surfaces, each of said first and second sensors being operative to generate an output responsive to a directional input thereto;
a processing unit communicatively coupled to said first and second sensors and operative to generate an output in response to said outputs of said first and second sensors, wherein said display element is communicatively coupled to said processing unit and is operative to display an image in response to said output of said processing unit; and
transmit/receive circuitry mounted within said shell and operative to transmit and receive.

19. The device of claim 18, further comprising a processing unit communicatively coupled to said first and second sensors and operative to generate an output in response to the outputs of said first and second sensors; wherein said display has a viewing face and is operative to display an image on said viewing face in response to the output of said processing unit.

20. The device of claim 19, wherein:
said viewing face of said display faces a first direction; said first chamfer surface faces a second direction; and said second chamfer surface faces a third direction.

21. The device of claim 20, wherein:
said first sensor is an optical sensor operative to generate an output in response to movement across a sensing face of said first sensor; and
said second sensor is an optical sensor operative to generate an output in response to movement across a sensing face of said second sensor.

22. The device of claim 21, wherein:
said sensing face of said first sensor is substantially aligned with an opening formed in said first chamfer surface of said shell and substantially faces the second direction; and said sensing face of said second sensor is substantially aligned with an opening formed in said second chamfer surface of said shell and substantially faces said third direction.

23. The device of claim 18, further comprising a switch communicatively coupled to said transmit/receive circuitry and configured to generate an output when depressed, wherein:
   said transmit/receive circuitry is operative to transmit in response to receiving the output of said switch;
   said shell is configured so that a user can hold said device in a first hand of the user, and on a simultaneous basis, move a thumb of a first hand of the user across said first sensor while holding said device in the first hand, and depress said switch using the first hand; and
   said shell is further configured so that a user can hold said device in a second hand of the user, and on a simultaneous basis, move a thumb of a second hand of the user across said second sensor, and depress said switch using the second hand.

24. A method of operating a hand-held communication device, comprising:
   grasping a shell of said hand-held communication device with only a first hand, said shell comprising a first chamfer surface which faces a direction exclusive of directions faced by front, back, side, top and bottom surfaces of said shell;
   simultaneous with said grasping
   (1) moving a thumb of the first hand so as to provide a directional input to a first sensor of said hand-held communication device which is associated with the first chamfer surface, where said directional input is sensed by the first sensor and cause a response on a display of said hand-held communication device to be prompted, and
   (2) depressing a switch of said hand-held communication device with a portion of the first hand to activate transmit/receive circuitry of said hand-held communication device to transmit.

25. The method of claim 24, further comprising:
   releasing said shell of said hand-held communication device from the first hand;
   grasping said shell of said hand-held communication device with only a second hand while, on a simultaneous basis, moving a thumb of the second hand across a second sensor of said hand-held communication device to prompt a response on a display of said hand-held communication device, and depressing said switch of said hand-held communication device with a portion of the second hand to activate said transmit/receive circuitry of said hand-held communication device to transmit.

26. The method of claim 24, wherein moving a thumb of the first hand across a first sensor of said hand-held communication device to prompt a response on a display of said hand-held communication device comprises moving the thumb of the first hand across said first sensor to prompt movement of a cursor on said display.

27. The method of claim 24, wherein grasping a shell of said hand-held communication device with only a first hand comprises grasping said shell so that a location of a center of gravity of said hand-held communication device in relation to a lengthwise direction of said shell coincides substantially with a location of the index finger of the first hand in relation to the lengthwise direction of said shell.

28. A hand-held communication device, comprising:
   a shell comprising:
      a front surface including a display element;
      a back surface opposed from said front surface;
      a side surface extending between said front and back surfaces;
      a chamfer surface adjoining said front and side surfaces, wherein a normal to said chamfer surface is angularly offset from a normal to an adjacent portion of said front surface by a first angle, said first angle being less than ninety degrees, and said normal to said chamfer surface is angularly offset from a normal to an adjacent portion of said side surface by a second angle, said second angle being less than ninety degrees; a sensor associated with said chamfer surface, said sensor operative to generate an output responsive to a directional input thereto;
   a processing unit communicatively coupled to said sensor and operative to generate an output in response to said output of said sensor, wherein said display element is communicatively coupled to said processing unit and is operative to display an image in response to said output of said processing unit;
   transmit/receive circuitry mounted within said shell and operative to transmit and receive; and
   a switch communicatively coupled to said transmit/receive circuitry, mounted on or extending through said side surface, and configured to generate an output when depressed, wherein said transmit/receive circuitry is operative to transmit in response to the output of said switch.

* * * * *